United States Patent
Mori (10) Patent No.: US 9,767,294 B2
(45) Date of Patent: Sep. 19, 2017

(54) INTERMEDIATE SERVER, DATABASE QUERY PROCESSING METHOD AND PROGRAM

(71) Applicant: NEC Corporation, Tokyo (JP)

(72) Inventor: Kengo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/651,111

(22) PCT Filed: Dec. 13, 2013

(86) PCT No.: PCT/JP2013/083447
§ 371 (c)(1),
(2) Date: Jun. 10, 2015

(87) PCT Pub. No.: WO2014/092180
PCT Pub. Date: Jun. 19, 2014

(65) Prior Publication Data
US 2015/0317483 A1 Nov. 5, 2015

(30) Foreign Application Priority Data
Dec. 13, 2012 (JP) .................................. 2012-272790

(51) Int. Cl.
*H04L 12/24* (2006.01)
*G06F 21/60* (2013.01)
(Continued)

(52) U.S. Cl.
CPC ............ *G06F 21/602* (2013.01); *G06F 12/00* (2013.01); *G06F 17/30* (2013.01);
(Continued)

(58) Field of Classification Search
CPC ................................................ H04L 12/2407
See application file for complete search history.

(56) References Cited

U.S. PATENT DOCUMENTS

| 9,213,867 B2 * | 12/2015 | Ramamurthy ...... G06F 21/6218 |
| 2002/0065956 A1 | 5/2002 | Yagawa et al. |

(Continued)

FOREIGN PATENT DOCUMENTS

| JP | 2002-169808 | 6/2002 |
| JP | 2005-084841 | 3/2005 |

(Continued)

OTHER PUBLICATIONS

Extended European Search Report issued by the European Patent Office for Application No. 13862815.1 dated Aug. 19, 2016 (8 pages).

(Continued)

*Primary Examiner* — Josnel Jeudy
(74) *Attorney, Agent, or Firm* — Wilmer Cutler Pickering Hale and Dorr LLP (57) ABSTRACT

To make it possible to prevent leakage of sensitive information from a database without using a server having both secure operation management and a high database operation processing capability. An intermediate server includes: a cryptography processing unit that encrypts or decrypts data stored in a database; a query conversion unit that converts a query to the database into a first query that does not need processing by the cryptography processing unit and a second query that needs the processing by the cryptography processing unit; and a query processing unit that sends the first query to a database server connected to the database to acquire a result from the database server, and executes the second query using the cryptography processing unit.

12 Claims, 5 Drawing Sheets

(51) Int. Cl.
*G06F 17/30* (2006.01)
*H04L 29/06* (2006.01)
*G06F 12/00* (2006.01)
*G06F 21/62* (2013.01)

(52) U.S. Cl.
CPC ........ *G06F 17/30513* (2013.01); *G06F 21/62* (2013.01); *G06F 21/6227* (2013.01); *H04L 63/0471* (2013.01)

(56) References Cited

U.S. PATENT DOCUMENTS

| | | | |
|---|---|---|---|
| 2002/0104002 A1* | 8/2002 | Nishizawa | H04L 63/0428 713/168 |
| 2002/0174115 A1* | 11/2002 | Shibuya | G06F 19/28 |
| 2004/0243799 A1 | 12/2004 | Hacigumus et al. | |
| 2005/0027680 A1 | 2/2005 | Yagawa et al. | |
| 2007/0174271 A1* | 7/2007 | Mattsson | G06F 17/30477 |
| 2007/0294338 A1 | 12/2007 | Nishizawa et al. | |
| 2014/0164758 A1* | 6/2014 | Ramamurthy | G06F 21/6218 713/150 |
| 2014/0281496 A1* | 9/2014 | Bent | H04L 63/0807 713/155 |

FOREIGN PATENT DOCUMENTS

| | | |
|---|---|---|
| JP | 2007-500912 | 1/2007 |
| JP | 2010-224655 | 10/2010 |
| JP | 2002-297606 | 10/2012 |

OTHER PUBLICATIONS

International Search Report corresponding to PCT/JP2013/083447, mail date Mar. 11, 2014, 2 pages.

Shizuka Kaneko, Studies on Speeding-up of Query of Privacy Preserving Search System using Bloom Filter Semi-ShuffledBF, Proceedings of the 4th Forum on Data Engineering and Information Management (the 10th Annual Meeting of the Database Society of Japan) [online] Proceedings of the 4th Forum on Data Engineering and Information Management, Jul. 13, 2012, (8 pages).

Takayuki Miyazaki, Indexing Method for Preventing Leakage of Tuple Information in Privacy Preserving Search that emphasizes Search Efficiency, the 5th Forum on Data Engineering and Information Management (the 11th Annual Meeting of the Database Society of Japan) [online] The 5th Forum on Data Engineering and Information Management, May 31, 2013, (8 pages).

* cited by examiner

INTERMEDIATE SERVER, DATABASE QUERY PROCESSING METHOD AND PROGRAM

DESCRIPTION OF RELATED APPLICATION

This application is a national stage application of International Application No. PCT/JP2013/083447 entitled "INTERMEDIATE SERVER, DATABASE QUERY PROCESSING METHOD AND PROGRAM" filed on Dec. 13, 2013, which claims the benefit of the priority of Japanese Patent Application No. 2012-272790, filed on Dec. 13, 2012, the disclosures of each of which are hereby incorporated by reference in their entirety.

TECHNICAL FIELD

The present invention relates to an intermediate server, a database query processing method, and a program, and in particular, to an intermediate server, a database query processing method, and a program that keep sensitive data stored in a database secret.

BACKGROUND ART

Figure 5:
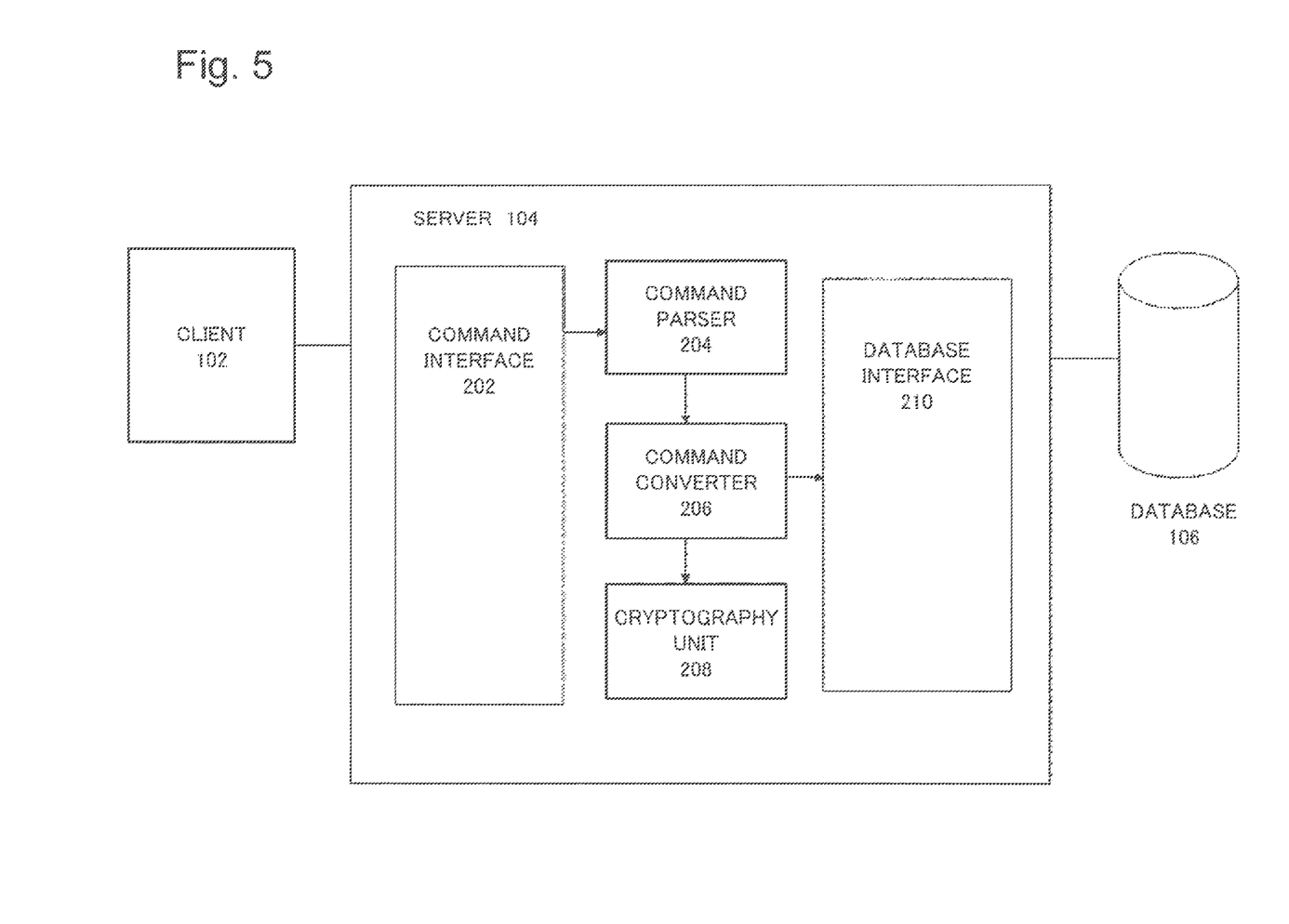
FIG. 5 is a block diagram illustrating a configuration of a database system described in PTL 1.

FIG. 5 is a block diagram illustrating a configuration of a database system described in PTL 1. Referring to FIG. 5, the database system includes a client 102, a server 104, and a database 106. In addition, the server 104 includes a command interface 202, a command parser 204, a command converter 206, a cryptography unit 208, and a database interface 210.

The database system illustrated in FIG. 5 operates as described below to execute database query processing while encrypting data in the database 106 and keeping the data secret.

The client 102 sends a database operation instruction described by a language such as SQL (Structured Query Language) to the server 104. The command interface 202 communicates with the client 102 and receives the database operation instruction. The command parser 204 parses (analyzes) the database operation instruction received by the command interface 202, and extracts such as an operator of processing to be executed, a column name of an operand to generate a parse tree. The command converter 206 determines the parse tree, and, when a column encrypted in the database 106 is an operand, converts an operation with respect to the column so as to include cryptography processing such as encryption and decryption. The server 104 executes a database operation in accordance with the conversion result obtained in this manner. When the conversion result includes cryptography processing such as encryption and decryption, the server 104 executes the cryptography processing using the cryptography unit 208.

In addition, query processing in a database system that stores a table including encrypted data is described in PTL 2.

CITATION LIST

Patent Literature

[PTL 1] Japanese Translation of PCT International Application Publication No. 2007-500912
[PTL 2] Japanese Unexamined Patent Application Publication No. 2010-224655

SUMMARY OF INVENTION

Technical Problem

The disclosure of the above-described patent literature is incorporated herein by reference in its entirety. The following analysis is made by the present inventor.

In the database system described in PTL 1 (FIG. 5), there is a problem in that the server 104 having both secure operation management and a high database operation processing capability is required.

The reason is that, according to the database system described in PTL 1, not only decryption of sensitive data encrypted in the database 106 and processing with respect to a decrypted plaintext but also processing with respect to unencrypted data in the database 106 is executed by the server 104.

In addition, according to the database processing method described in PTL 2, there is a problem in that, when processing of a single query is processed with a plurality of devices, load distribution cannot be achieved. This is because both a query with respect to encrypted data and a query with respect to unencrypted data are directly processed by a map storage device or a map delivery device.

Therefore, it is required to make it possible to prevent leakage of sensitive information from a database without using a server having both secure operation management and a high database operation processing capability. An object of the present invention is to provide a database system, a database query processing method, and a program that contribute to such a requirement.

Solution to Problem

An intermediate server according to a first aspect of the present invention includes: a cryptography processing unit that encrypts or decrypts data stored in a database; a query conversion unit that converts a query to the database into a first query that does not need processing by the cryptography processing unit and a second query that needs the processing by the cryptography processing unit; and a query processing unit that sends the first query to a database server connected to the database to acquire a result from the database server, and executes the second query using the cryptography processing unit.

A database query processing method executed by a computer, according to a second aspect of the present invention, includes: a conversion step of converting a query to a database into a first query that does not need encryption processing and decryption processing and a second query that needs the encryption processing or the decryption processing; an acquisition step of sending the first query to a database server connected to the database to acquire a result from the database server; and a step of executing the second query using the encryption processing or the decryption processing.

A program according to a third aspect of the present invention makes a computer execute: conversion processing for converting a query to a database into a first query that does not need encryption processing and decryption processing and a second query that needs the encryption processing or the decryption processing; acquisition processing for sending the first query to a database server connected to the database to acquire a result from the database server; and processing for executing the second query using the encryption processing or the decryption processing. In addition, the program can be provided as a program product stored in a non-transitory computer-readable storage medium.

Advantageous Effects of Invention

The intermediate server, the database query processing method, and the program according to the present invention contribute to making it possible to prevent leakage of sensitive information from a database without using a server having both secure operation management and a high database operation processing capability.

DESCRIPTION OF EMBODIMENTS

First, an outline of one exemplary embodiment will be described. Reference numerals denoted in the outline are merely examples to help understanding, and do not intend that the present invention is limited to the illustrated mode.

Figure 1:
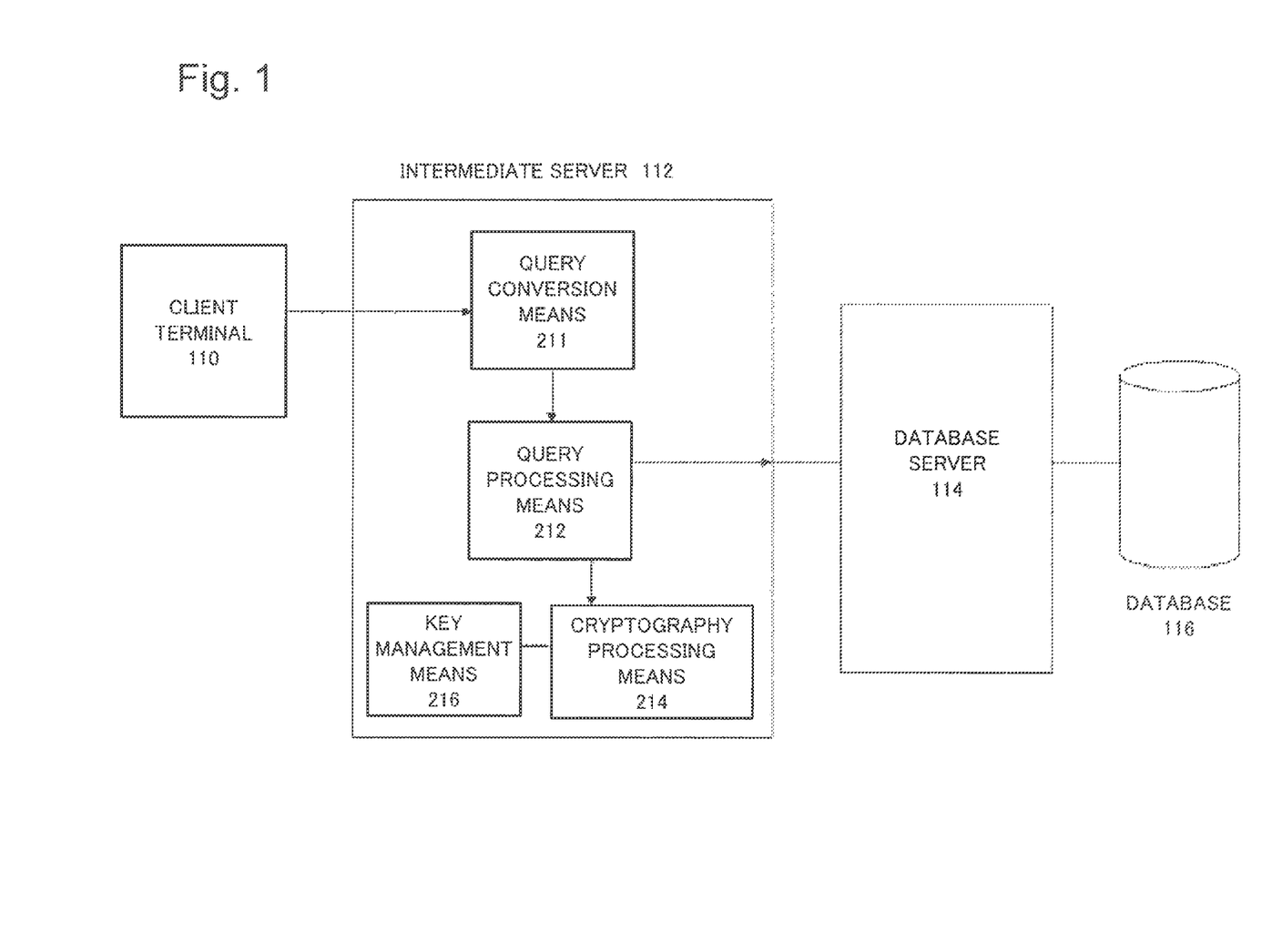
FIG. 1 is an exemplary block diagram illustrating a configuration of a database system according to a first exemplary embodiment.

Referring to FIG. 1, an intermediate server 112 includes a query conversion unit 211, a query processing unit 212, and a cryptography processing unit 214. The cryptography processing unit 214 encrypts or decrypts data stored in a database 116. The query conversion unit 211 converts a query to the database 116 into a first query (insensitive query) that does not need processing by the cryptography processing unit 214 and a second query (sensitive query) that needs the processing by the cryptography processing unit 214. The query processing unit 212 sends the first query (insensitive query) to a database server 114 connected to the database 116 to acquire a result from the database server 114. The query processing unit 212 further executes the second query (sensitive query) using the cryptography processing unit 214.

The query conversion unit 211 classifies a selection condition (condition included in WHERE clause of SQL statement) included in the query to the database 116 (for example, SQL statement) into first selection conditions (for example, $F\{h1\}, \ldots, F\{hz\}$ described below) that do not need the processing by the cryptography processing unit 214 and second selection conditions (for example, $F\{s1\}, \ldots, F\{sx\}$ described below) that need the processing by the cryptography processing unit 214. The query conversion unit 211 classifies tables included in the query into first tables (for example, $T\{g1\}, \ldots, T\{gy\}$ described below) that are referred to only the first selection conditions ($F\{h1\}, \ldots, F\{hz\}$) and remaining second tables (for example, $T\{e1\}, \ldots, T\{ew\}$ described below). In addition, the query conversion unit 211 generates the first query (insensitive query) on the basis of the first selection conditions ($F\{h1\}, \ldots, F\{hz\}$) and the first tables ($T\{g1\}, \ldots,$ $T\{gy\}$), and generates the second query (sensitive query) on the basis of the second selection conditions ($F\{s1\}, \ldots,$ $F\{sx\}$), the second tables ($T\{e1\}, \ldots, T\{ew\}$), and the result of the first query acquired from the database server 114.

Furthermore, by classifying a plurality of the first tables ($T\{g1\}, \ldots, T\{gy\}$) according to whether or not to have a column that is referred to the first selection conditions ($F\{h1\}, \ldots, F\{hz\}$), the query conversion unit 211 further divides the first query into a plurality parts of the query (for example, right side of Equation 3 described below). The query processing unit 212 sends the plurality parts (right side of Equation 3) obtained by dividing the first query to the database server 114 to acquire a processing result with respect to each of the plurality parts (right side of Equation 3) from the database server 114.

Figure 4:
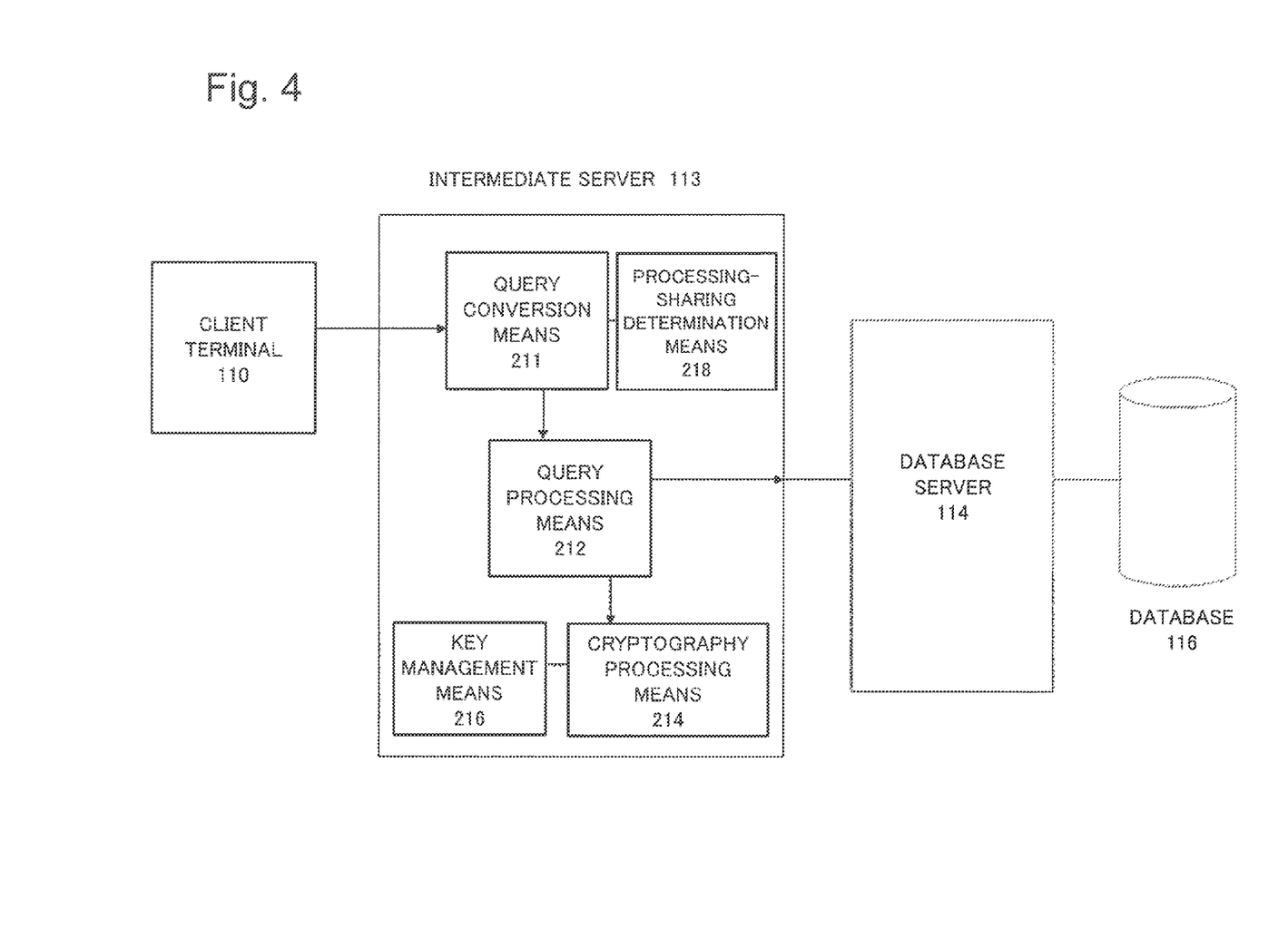
FIG. 4 is an exemplary block diagram illustrating a configuration of a database system according to a second exemplary embodiment.

As illustrated in FIG. 4, it is preferable that an intermediate server 113 further include a processing-sharing determination unit 218. The processing-sharing determination unit 218 determines whether or not the first query should be executed by the database server 114 in accordance with an increase or decrease of a data amount before and after processing when processing the first query by the database server 114. As a result of the determination, when the first query (insensitive query) should not be executed by the database server 114, the processing-sharing determination unit 218 converts the first query (insensitive query) into a third query for being executed by the query processing unit 212 (for example, intermediate-type insensitive query described below). At this time, the query processing unit 212 further executes the third query (intermediate-type insensitive query).

As one example, when the data amount after execution is more increased than that before the execution when executing the first query by the database server 114, the processing-sharing determination unit 218 may determine that the first query (insensitive query) should not be executed by the database server 114.

The processing-sharing determination unit 218 separates the first query (insensitive query, for example, right side of Equation 4 described below) into a fourth query (for example, right side of Equation 5 described below) that is executed by acquiring the first tables ($T\{g1\}, \ldots, T\{gy\}$) from the database server 114 and a remaining fifth query (for example, right side of Equation 6 described below). As a result of the separation, the processing-sharing determination unit 218 generates the third query consisted of the fourth query and the fifth query. At this time, the query processing unit 212 acquires the first tables ($T\{g1\}, \ldots, T\{gy\}$) from the database server 114 to execute the fourth query (right side of Equation 5), and executes the fifth query (right side of Equation 6).

In addition, referring to FIG. 1, the intermediate server 112 according to the present invention includes a key management unit 216, the cryptography processing unit 214, the query conversion unit 211, and the query processing unit 212. The key management unit 216 stores and manages secret information such as a cryptographic key used for protecting sensitive information. The cryptography processing unit 214 executes processing using the secret information of the key management unit 216, such as keeping a secret by encryption and conversion of data, and restoration by decryption and reverse conversion of the secret data. The query conversion unit 211 converts into a combination of a database query (sensitive query) that needs an operation by the cryptography processing unit 214 and processing with respect to a result of the operation, with a remaining database query (insensitive query). The operation by the cryptography processing unit 214 uses a database query as input, and includes protection of sensitive information included in the database query, restoration of the protected sensitive information stored in the database 116, and the like. The query processing unit 212 sends the insensitive query in the database queries that the query conversion unit 211 outputs to the database server 114 to acquire a processing result. With the acquisition, the query processing unit 212 executes the sensitive query using the cryptography processing unit 214.

In a database system including the above-described intermediate server 112, a database query from a client terminal (herein after, described as "client") 110 is converted into a sensitive query and an insensitive query by the query conversion unit 211 in the intermediate server 112. Furthermore, the query conversion unit 211 sends the insensitive query to the database server 114 to make it be processed, and makes the sensitive query be processed by the query processing unit 212 in the intermediate server 112. Accordingly, since the insensitive query is executed by the database server 114, database query processing in the intermediate server 112 is reduced, and it becomes unnecessary to directly deal with the secret information used for protecting sensitive information and unprotected sensitive information in the database server 114.

Accordingly, it becomes possible to prevent leakage of sensitive information from the database 116 without providing in a database system a server having both secure operation management and a high database operation processing capability in a single server.

The reason is that a database query is converted into a sensitive query that needs restoration of protected sensitive data and processing for unprotected sensitive data obtained as a result, and a remaining insensitive query. As a result, the intermediate server 112 executes the sensitive query that needs secure operation management, and the database server 114 executes only the insensitive query.

In the present invention, the following modes can be adopted.

[Mode 1]

It is as described in the intermediate server according to the above-described first aspect.

[Mode 2]

The query conversion unit may classify a selection condition included in the query to the database into a first selection condition that does not need the processing by the cryptography processing unit and a second selection condition that needs the processing by the cryptography processing unit, and classify a table included in the query into a first table that is referred to only the first selection condition and a remaining second table, and may generate the first query on the basis of the first selection condition and the first table, and generate the second query on the basis of the second selection condition, the second table, and the result of the first query acquired from the database server.

[Mode 3]

By classifying a plurality of the first tables according to whether or not to have a column that is referred to the first selection condition, the query conversion unit may further divide the first query into a plurality parts of queries, and the query processing unit may send the plurality parts of queries obtained by dividing the first query to the database server to acquire a processing result with respect to each of the plurality parts from the database server.

[Mode 4]

The intermediate server further includes: a processing-sharing determination unit that determines whether or not the first query should be executed by the database server in accordance with an increase or decrease of a data amount before and after processing when processing the first query by the database server, and, when the first query should not be executed by the database server, converts the first query into a third query for being executed by the query processing unit, in which the query processing unit may further execute the third query.

[Mode 5]

When the data amount after execution is more increased than that before the execution when executing the first query by the database server, the processing-sharing determination unit may determine that the first query should not be executed by the database server.

[Mode 6]

The processing-sharing determination unit may separate the first query into a fourth query that is executed by acquiring the first tables from the database server and a remaining fifth query to generate the third query consisted of the fourth query and the fifth query, and the query processing unit may acquire the first tables from the database server to execute the fourth query, and execute the fifth query.

[Mode 7]

It is as described in the database query processing method according to the above-described second aspect.

[Mode 8]

The conversion step may include a step of classifying a selection condition included in the query to the database into a first selection condition that does not need the encryption processing and the decryption processing and a second selection condition that needs the encryption processing or the decryption processing, and classifying a table included in the query into a first table that is referred to only the first selection condition and a remaining second table, and a step of generating the first query on the basis of the first selection condition and the first table, and generating the second query on the basis of the second selection condition, the second table, and the result of the first query acquired from the database server.

[Mode 9]

In the conversion step, by classifying a plurality of the first tables according to whether or not to have a column that is referred to the first selection condition, the first query may be further divided into a plurality parts of queries, and, in the acquisition step, the plurality parts of queries obtained by dividing the first query may be sent to the database server, and a processing result with respect to each of the plurality parts may be acquired from the database server.

[Mode 10]

The database query processing method may include: a determination step of determining whether or not the first query should be executed by the database server in accordance with an increase or decrease of a data amount before and after processing when processing the first query by the database server; and a step of, when it is determined that the first query should not be executed by the database server, converting the first query into a third query and executing the third query.

[Mode 11]

In the determination step, when the data amount after execution is more increased than that before the execution when executing the first query by the database server, it may be determined that the first query should not be executed by the database server.

[Mode 12]

The database query processing method may include: a step of, when it is determined that the first query should not be executed by the database server, separating the first query into a fourth query that is executed by acquiring the first tables from the database server and a remaining fifth query to generate the third query consisted of the fourth query and the fifth query; and a step of acquiring the first tables from the database server to execute the fourth query, and executing the fifth query.

[Mode 13]

It is as described in the program according to the above-described third aspect.

[Mode 14]

The conversion processing may include processing for classifying a selection condition included in the query to the database into a first selection condition that does not need the encryption processing and the decryption processing and a second selection condition that needs the encryption processing or the decryption processing, and classifying a table included in the query into a first table that is referred to only the first selection condition and a remaining second table, and processing for generating the first query on the basis of the first selection condition and the first table, and generating the second query on the basis of the second selection condition, the second table, and the result of the first query acquired from the database server.

[Mode 15]

In the conversion processing, by classifying a plurality of the first tables according to whether or not to have a column that is referred to the first selection condition, the first query may be further divided into a plurality parts of queries, and, in the acquisition processing, the plurality parts obtained by dividing the first query may be sent to the database server, and a processing result with respect to each of the plurality parts may be acquired from the database server.

[Mode 16]

The program may make the computer execute: determination processing for determining whether or not the first query should be executed by the database server in accordance with an increase or decrease of a data amount before and after processing when processing the first query by the database server; and processing for, when it is determined that the first query should not be executed by the database server, converting the first query into a third query and executing the third query.

[Mode 17]

In the determination processing, when the data amount after execution is more increased than that before the execution when executing the first query by the database server, it may be determined that the first query should not be executed by the database server.

[Mode 18]

The program may make the computer execute: processing for, when it is determined that the first query should not be executed by the database server, separating the first query into a fourth query that is executed by acquiring the first tables from the database server and a remaining fifth query to generate the third query consisted of the fourth query and the fifth query; and processing for acquiring the first tables from the database server to execute the fourth query, and executing the fifth query.

First Exemplary Embodiment

An intermediate server according to the first exemplary embodiment will be described in detail with reference to the drawings.

FIG. 1 is a block diagram illustrating a configuration of a database system including an intermediate server 112 according to the present exemplary embodiment, as one example. As illustrated in FIG. 1, the database system includes the intermediate server 112, a database server 114, and a database 116. The database system accepts access from a client 110. In addition, the intermediate server 112 includes a query conversion unit 211, a query processing unit 212, a key management unit 216, and a cryptography processing unit 214.

Each of these unit operates generally as follows.

The key management unit 216 stores and manages secret information such as a cryptographic key used for protecting sensitive information in the database 116.

The cryptography processing unit 214 executes processing such as keeping a secret by anonymizing, encryption, or the like, and restoration by decryption or the like, of data, using the secret information stored in the key management unit 216.

The query conversion unit 211 converts a database query from the client 110 as input into a series of a sensitive query and a remaining database query (hereinafter, referred to as "insensitive query"). The "sensitive query" is a database query that needs an operation by the cryptography processing unit 214 with respect to data stored in the database 116 and processing with respect to a result of the operation.

The query processing unit 212 sends the insensitive query in the database queries that the query conversion unit 211 outputs to the database server 114 to acquire a result. On the other hand, with respect to the sensitive query, the query processing unit 212 executes a query using the cryptography processing unit 214.

Figure 2:
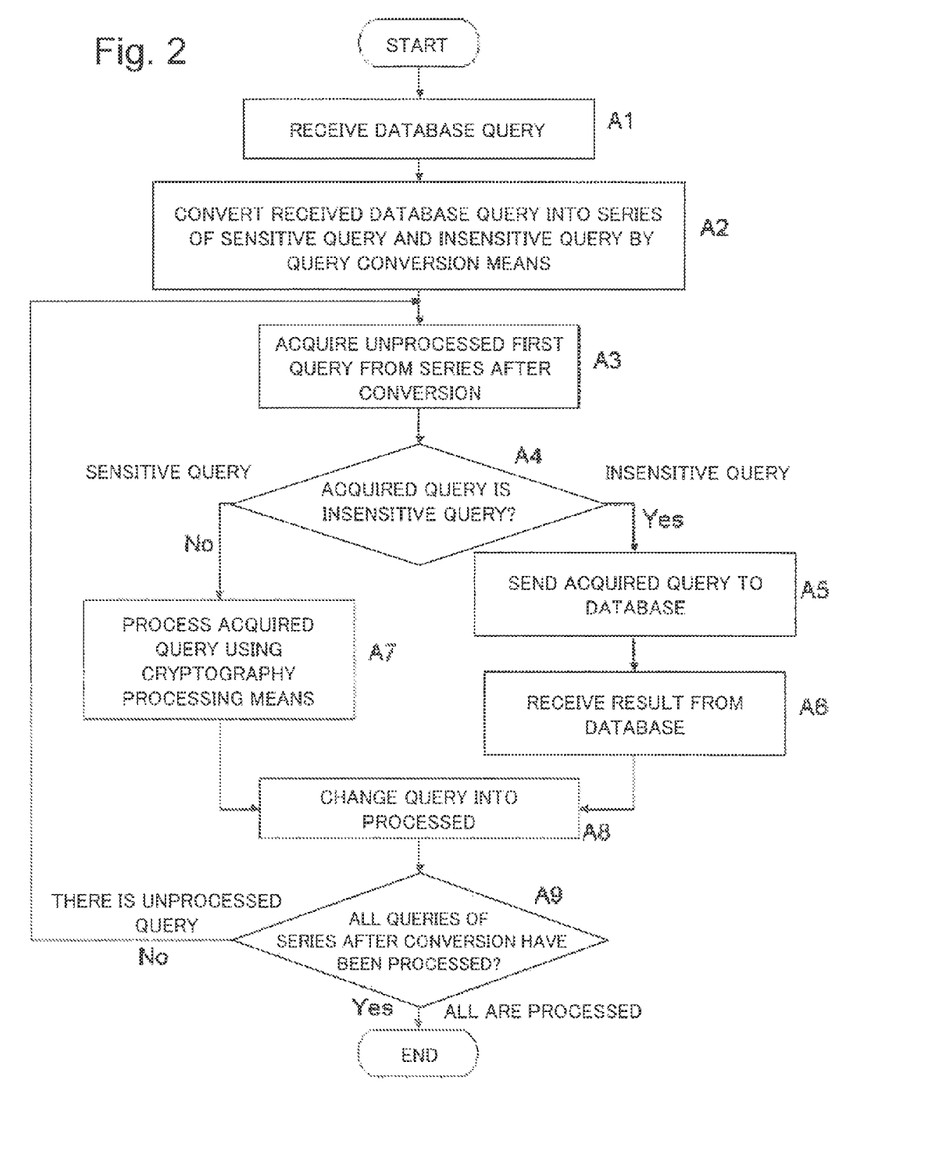
FIG. 2 is an exemplary flowchart illustrating an operation of the database system according to the first exemplary embodiment.

FIG. 2 is a flowchart illustrating an operation of the database system according to the present exemplary embodiment (FIG. 1), as one example. The operation of the entire database system of the present exemplary embodiment will be described in detail with reference to FIG. 2.

First, the intermediate server 112 receives a database query from the client 110 (Step A1).

Next, the query conversion unit 211 converts the received database query into a series of a sensitive query and an insensitive query (Step A2).

Next, the query processing unit 212 refers to the series of the queries after the conversion, and acquires a first query among unprocessed queries whose processing is not finished (Step A3).

Next, the query processing unit 212 checks whether the acquired query is an insensitive query or a sensitive query (Step A4).

In the case of the insensitive query (Yes in Step A4), the query processing unit 212 sends the acquired query to the database server 114 (Step A5) to receive a processing result of the query processed by the database server 114 (Step A6).

On the other hand, in the case of the sensitive query (No in Step A4), the query processing unit 212 executes processing of keeping a secret by anonymizing or encryption, and processing of restoration by decryption or the like, of sensitive data included in the query, using the cryptography processing unit 214 and the key management unit 216 (Step A7).

Next, the query processing unit 212 makes the query acquired in Step A3 be processed (Step A8).

Next, the query processing unit 212 refers to the series of the queries after the conversion, and determines whether all the queries are made to be processed (Step A9).

When a query that is not made to be processed remains (No in Step A9), the processing is returned to Step A3. On the other hand, when all are made to be processed (Yes in Step A9), the processing is ended.

Figure 3:
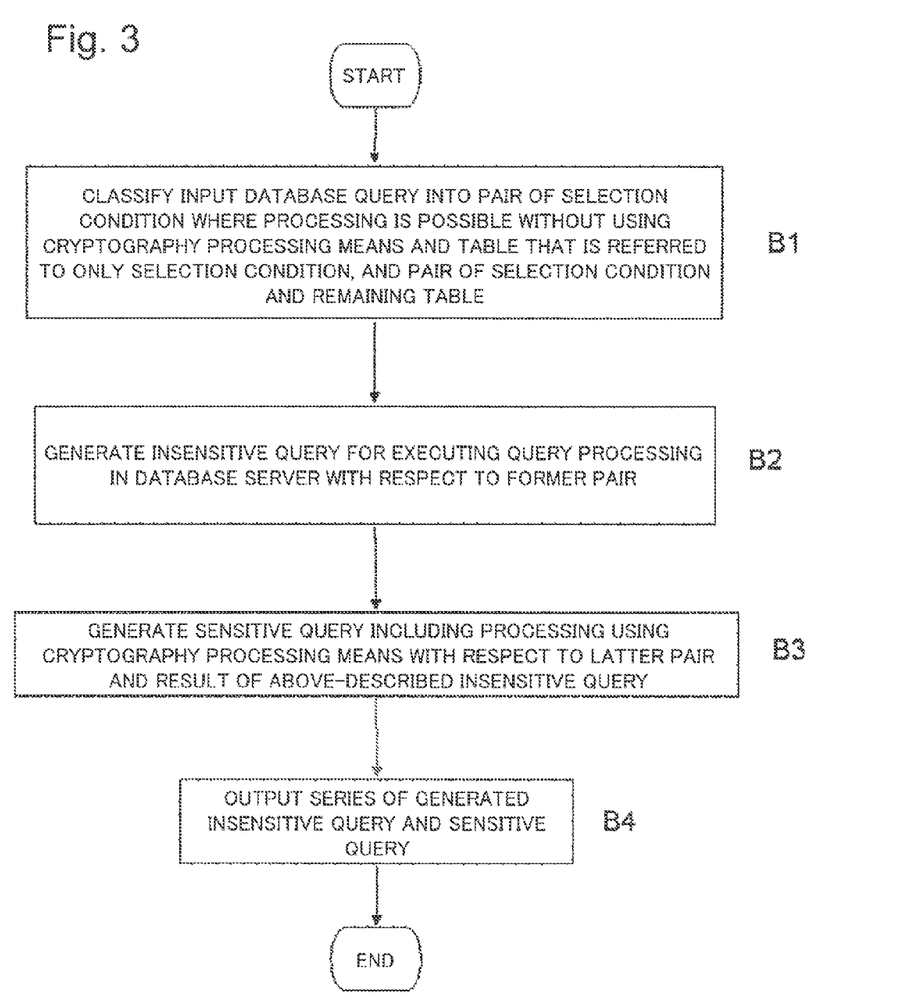
FIG. 3 is an exemplary flowchart illustrating an operation of a query conversion unit in the database system according to the first exemplary embodiment.

FIG. 3 is a flowchart illustrating an operation of the query conversion unit 211, as one example. The operation of the query conversion unit 211 will be described with reference to FIG. 3.

For example, the query conversion unit 211 can be achieved as follows with respect to a general database query by SQL.

Here, a general representation of the inputted database query is as follows. However, the representation of the database query in the present invention is not limited to the following.

SELECT $C\{1\}, \ldots, C\{p\}$ FROM $T\{1\}, T\{2\}, \ldots,$
  $T\{q\}$ WHERE $F\{1\}$ AND $F\{2\}$ AND $\ldots$ AND
  $F\{r\}$ First, the query conversion unit 211 screens tables $T\{1\}$, $T\{2\}, \ldots, T\{q\}$ specified by a FROM clause and selection conditions $F\{1\}, F\{2\}, \ldots, F\{r\}$ specified by a WHERE clause. After that, the query conversion unit 211 classifies the table and the selection condition as follows, on the basis of a reference relationship by a selection condition that needs processing using the cryptography processing unit 214 for determination of a condition (Step B1).

α) A condition where a column that needs to be kept a secret by encryption or the like in a database (hereinafter, referred to as "secret column") is not included at all in a target column of a selection condition, or even if it is included, determination is possible by an operation that does not need restoration or the like of secret data (for example, condition according to the number of pieces of data included in column) $F\{h1\}, \ldots, F\{hz\}$, and tables $T\{g1\}, \ldots, T\{gy\}$ that are referred to only $F\{h1\}, \ldots, F\{hz\}$ β) Selection conditions $F\{s1\}, \ldots, F\{sx\}$ obtained by removing $F\{h1\}, \ldots, F\{hz\}$ from $F\{1\}, \ldots, F\{r\}$, and tables $T\{e1\}, \ldots, T\{ew\}$ obtained by removing $T\{g1\}, \ldots, T\{gy\}$ from $T\{1\}, T\{2\}, \ldots, T\{q\}$.

Next, the query conversion unit 211 generates a series of insensitive queries as follows, on the basis of the tables and the selection conditions classified in Step B1 (Step B2).

First, the query conversion unit 211 generates an insensitive query by the following SQL statement, for $T\{g1\}, \ldots, T\{gy\}$ classified into α).

$T'\{\alpha\}$=SELECT $C^*\{\alpha\}$ FROM $T\{g1\}, \ldots, T\{gy\}$
  WHERE $F\{h1\}$ AND $\ldots$ AND $F\{hz\}$ [Equation 1]

The SQL statement of the right side of the equal sign in Equation 1 represents the insensitive query to be sent to the database server 114. On the other hand, the left side of the equal sign in Equation 1 indicates that the intermediate server 112 stores a result of the query of the right side in a memory or the like (not illustrated) in the intermediate server 112 under the table name of the left side of the equal sign. In addition, $C^*\{\alpha\}$ is a column-specified abbreviation consisted of, among columns that the tables $T\{g1\}, \ldots, T\{gy\}$ have, all of those included in the column names $C\{1\}, \ldots, C\{k\}$ specified by the SQL statement of input, and those included in the column name that $F\{s1\}, \ldots, F\{sx\}$ refer to.

Next, the query conversion unit 211 generates an insensitive query by the following SQL statement of Equation 2, for $T\{e1\}, \ldots, T\{ew\}$ classified into β).

$T'\{e1\}$=SELECT $C^*\{e1\}$ FROM $T\{e1\}$ $T'\{e2\}$=SELECT $C^*\{e2\}$ FROM $T\{e2\}$

:

$T'\{ew\}$=SELECT $C^*\{ew\}$ FROM $T\{ew\}$ [Equation 2]

Here, each of $C^*\{e1\}, \ldots, C^*\{ew\}$ is a column-specified abbreviation consisted of, among columns that $T\{e1\}, \ldots, T\{ew\}$ have, all of those included in the column names $C\{1\}, \ldots, C\{k\}$ specified by the SQL statement of input, and those included in the column names that $F\{s1\}, \ldots, F\{sx\}$ refers to.

All of the queries represented by the SQL statements so far do not include the selection conditions $F\{s1\}, \ldots, F\{sx\}$ that needs processing using the cryptography processing unit 214, and thus, are insensitive queries.

Next, the query conversion unit 211 generates a sensitive query by the following SQL statement (Step B3).

SELECT $C\{1\}, \ldots, C\{k\}$ FROM $T'\{\alpha\}$,
  $T'\{e1\}, \ldots, T'\{ew\}$ WHERE $F\{s1\}$ AND $\ldots$
  AND $F\{sx\}$ This SQL statement is query processing that refers to a result of the insensitive queries generated in Step B2, and is a sensitive query including the selection condition that needs processing using the cryptography processing unit 214.

Next, the query conversion unit 211 outputs together the sensitive query generated in Step B3 following the series of the insensitive queries generated in Step B2 (Step B4). At this time, in the series to be outputted, the order of the insensitive queries generated in Step B2 may be changed.

By converting a database query into a series of an insensitive query and a sensitive query with the query conversion unit 211, it becomes possible for the query processing unit 212 to make the database server 114 execute the insensitive query that does not need processing in the intermediate server 112. Therefore, an increase in database operation processing in the intermediate server 104 can be suppressed.

Furthermore, the SQL statement of the insensitive query for obtaining $T'\{\alpha\}$ in the above-described Step B2 can also be converted into a series of SQL statements of insensitive queries such as the following Equation 3.

$T'\{\alpha1\}$=SELECT $C^*\{\alpha1\}$ FROM $T\{g1\}, \ldots,$
  $T\{gi\}$ WHERE $F\{h1\}$ AND $\ldots$ AND
  $F\{hj\}$ $T'\{\alpha2\}$=SELECT $C^*\{\alpha2\}$ FROM $T\{g$
  $\{i+1\}\}, \ldots, T\{g\{i+a\}\}$ WHERE $F\{h\{j+1\}\}$
  AND $\ldots$ AND $F\{h\{j+b\}\}$

:

$T'\{an\}$=SELECT $C^*\{an\}$ FROM $T\{gd\}, \ldots, T\{gn\}$
  WHERE $F\{hd\}$ AND $\ldots$ AND $F\{hn\}$ [Equation 3]

The sensitive query at this time is expressed as follows.

SELECT $C\{1\}, \ldots, C\{k\}$ FROM $T'\{\alpha1\}, \ldots,$
  $T'\{an\}, T'\{e1\}, \ldots, T'\{ew\}$ WHERE $F\{s1\}$
  AND $\ldots$ AND $F\{sx\}$ Tables specified in the FROM clauses of the SQL statements of the right sides of $T'\{\alpha1\}, \ldots, T'\{an\}$ and selection conditions specified in the WHERE clauses are obtained by closure division (closed partition) of the tables $T\{g1\}, \ldots, T\{gy\}$, on the basis of a relationship whether or not to have a column that the selection conditions $F\{h1\}, \ldots, F\{hz\}$ refer to.

Each of $C^*\{\alpha1\}, \ldots, C^*\{an\}$ is a column-specified abbreviation consisted of, among columns that tables specified by the FROM clauses of the SQL statements of the right sides of T' {α1}, ..., T'{an} have, all of those included in the column names C{1}, ..., C{k} specified by the SQL statement of input, and those included in the column names that F{s1}, ..., F{sx} refer to.

In a query before dividing the insensitive query, the database server 114 connects y tables by one query, and thus, y−1 times of table connection processing are required. On the other hand, by dividing the insensitive query into the series of Equation 3, in a query after the division, the query is divided into n times and the table connection processing can be done by s·n times of processing. Therefore, by dividing the insensitive query as Equation 3, processing in the database server 114 can be reduced.

In addition, generally, when a table having the number of pieces of data of a and a table having the number of pieces of data of b are connected, the number of pieces of data of a table in a connection result becomes a×b at most. Therefore, in the query before the division, the number of pieces of data to be sent to the intermediate server 102 from the database server 114 $|T'\{α\}|$ becomes $|T\{g1\}|×...×|T\{gy\}|=|T'\{α1\}|×...×|T'\{an\}|$ at most. On the other hand, after the division, the number becomes $|T'\{α1\}|+...+|T'\{an\}|$, and thus, it can be expected that the number of pieces of data is more suppressed than before the division.

Next, an effect achieved by the database system including the intermediate server 112 according to the present exemplary embodiment will be described.

In the database system including the intermediate server 112, the query conversion unit 211 converts a database query into a series of a sensitive query and an insensitive query, the sensitive query requiring secure operation management is processed in the intermediate server 112, and the insensitive query is processed in the database server 114. Therefore, leakage of sensitive information from a database can be prevented without using a server having both secure operation management and high database operation processing performance.

In addition, by further dividing the series of the insensitive queries generated in the query conversion unit 211, the number of table connection processing in the database server 114 can be suppressed. Furthermore, in this case, an increase in the number of pieces of data of a result of the insensitive queries is suppressed, and communication traffic between the database server 114 and the intermediate server 112 can also be suppressed.

Second Exemplary Embodiment

Next, an intermediate server according to the second exemplary embodiment will be described in detail with reference to the drawing. FIG. 4 is a block diagram illustrating a configuration of a database system including an intermediate server 113 according to the present exemplary embodiment, as one example.

Referring to FIG. 4, the intermediate server 113 of the present exemplary embodiment further includes a processing-sharing determination unit 218 in addition to a configuration of the intermediate server 112 of the first exemplary embodiment (FIG. 1).

The processing-sharing determination unit 218 uses an insensitive query from a query conversion unit 211 as input. The processing-sharing determination unit 218 determines whether communication traffic and a calculation amount become smaller when processing the insensitive query by the intermediate server 112 after acquiring a necessary table in the intermediate server 113, compared to when processing the insensitive query by a database server 114.

When the communication traffic and the calculation amount become smaller, the processing-sharing determination unit 218 converts the insensitive query received from the query conversion unit 211 into a query consisted of an insensitive query that acquires in the intermediate server 113 the necessary table from the database server 114 and the remaining insensitive query (hereinafter, referred to as "intermediate-type insensitive query"), and outputs the queries.

On the other hand, when the communication traffic and the calculation amount do not become smaller, the processing-sharing determination unit 218 outputs a determination result of conversion unnecessary. In addition, in this case, the processing-sharing determination unit 218 directly outputs the insensitive query received from the query conversion unit 211 without conversion. Hereinafter, the directly-outputted insensitive query without being converted by the query conversion unit 211 is referred to as a "regular insensitive query".

The query conversion unit 211 converts the inputted database query into a series of a sensitive query and an insensitive query, and outputs the query to a query processing unit 212 after replacing the insensitive query with the intermediate-type insensitive query and the regular insensitive query, using the processing-sharing determination unit 218.

The query processing unit 212 sends, in the database queries that the query conversion unit 211 outputs, the regular insensitive query to the database server 114 to acquire a result, and then, executes the intermediate-type insensitive query. In addition, the query processing unit 212 executes the sensitive query using the cryptography processing unit 214.

The processing-sharing determination unit 218 operates as follows.

When receiving the insensitive query from the query conversion unit 211, firstly, the processing-sharing determination unit 218 determines contents of a table and a selection condition included in the query, and determines whether the communication traffic and the calculation amount become smaller when processing with the intermediate server 113. Specifically, the processing-sharing determination unit 218 determines whether the query is a query that is expected to increase the number of pieces of data after executing processing, on the basis of information of a past execution state of database query processing. This is because, in this case, it is expected that the communication traffic and the calculation amount become smaller when processing the query in the intermediate server 113 after acquiring a table of a processing target in the intermediate server 113, compared to when processing with the database server 114. Therefore, in such a case, the processing-sharing determination unit 218 converts the insensitive query received from the query conversion unit 211 into the intermediate-type insensitive query, as follows.

Here, as one example, it is assumed that the received insensitive query is expressed as the following Equation 4.

$$T\{α\} = \text{SELECT } C^*\{α\} \text{ FROM } T\{g1\}, ..., T\{gy\}$$
$$\text{WHERE } F\{h1\} \text{ AND } ... \text{ AND } F\{hz\} \quad \text{[Equation 4]}$$

At this time, the processing-sharing determination unit 218 outputs a series consisted of the following Equation 5 and Equation 6, as the intermediate-type insensitive query.

$$T'\{g1\} = \text{SELECT } C^*\{g1\} \text{ FROM } T\{g1\}$$

$$T'\{g2\} = \text{SELECT } C^*\{g2\} \text{ FROM } T\{g2\}$$

$$\vdots$$

$$T'\{gy\} = \text{SELECT } C^*\{gy\} \text{ FROM } T\{gy\} \quad \text{[Equation 5]}$$

$$T'\{\alpha\} = \text{SELECT } C^*\{\alpha\} \text{ FROM } T'\{g1\}, \ldots, T'\{gy\}$$
$$\text{WHERE } F\{h1\} \text{ AND } \ldots \text{ AND } F\{hz\} \quad \text{[Equation 6]}$$

Here, $C^*\{g1\}, C^*\{g2\}, \ldots, C^*\{gi\}$ are column-specified abbreviations consisted of, among columns that the tables $T\{g1\}, \ldots, T\{gy\}$ have, all of those included in $C^*\{\alpha\}$.

On the other hand, in a selection condition for acquiring a row in which a column value is a certain constant or more, and a selection condition for connecting tables to each other by agreement of column values, the number of pieces of data is generally decreased by executing query processing. Thus, even when processing with the intermediate server 113, it cannot be expected that the communication traffic and the calculation amount become smaller, compared to when processing with the database server 114. In addition, even in selection conditions other than these, similarly, it cannot be expected that, for a query that is expected to decrease the number of pieces of data after executing processing, on the basis of information of a past execution state of database query processing, the communication traffic and the calculation amount become smaller even when processing with the intermediate server 112. Therefore, in these cases, the processing-sharing determination unit 218 determines to be conversion unnecessary.

The intermediate server 113 may cache (record) a series of an insensitive query sent to the database server 114 and an execution result thereof. At this time, when a table or a query stored in a cache is included in the received insensitive query, the processing-sharing determination unit 218 converts into an intermediate-type insensitive query that refers to the cache. Accordingly, communication traffic between the database server 114 and the intermediate server 113 can be further reduced.

Next, an effect achieved by the intermediate server 113 according to the present exemplary embodiment will be described.

The intermediate server 113 according to the present exemplary embodiment (FIG. 4) further includes the processing-sharing determination unit 218 in addition to the configuration of the intermediate server 112 according to the first exemplary embodiment (FIG. 1). The processing-sharing determination unit 218 converts an insensitive query into a series of an intermediate-type insensitive query and a regular insensitive query such that communication traffic between the database server 114 and the intermediate server 113, and an amount of data processing are reduced, and the query processing unit 212 processes the intermediate-type insensitive query in addition to a sensitive query. Therefore, according to the present exemplary embodiment, the communication traffic between the database server 114 and the intermediate server 112 can be further reduced, and the amount of data processing can also be reduced, in addition to the effect of the first exemplary embodiment.

As one example, the database system according to the present invention can be applied to a database system for executing a database query while keeping sensitive data secret.

It is to be noted that the disclosure of the above-described patent literature is incorporated herein by reference. Within the scope of the entire disclosure (including claims) of the present invention, and in addition, on the basis of the basic technical ideas, the exemplary embodiments can be changed and modified. Moreover, within the scope of claims of the present invention, various combinations or selections of various disclosed elements (including each element of each claim, each element of each exemplary embodiment, each element of each drawing and the like) are possible. More specifically, it is apparent that the present invention includes various modifications and changes that can be made by those skilled in the art according to all disclosure including claims, and the technical ideas. In particular, regarding the value range described herein, any value or small range included in the range should be interpreted as being specifically described even when there is no particular description.

REFERENCE SIGNS LIST 102 client
104 server
106 database
110 client
112, 113 intermediate server
114 database server
116 database
202 command interface
204 command parser
206 command converter
208 cryptography unit
210 database interface
211 query conversion unit
212 query processing unit
214 cryptography processing unit
216 key management unit
218 processing-sharing determination unit

The invention claimed is:

1. An intermediate server comprising:
a memory configured to store instructions; and at least one processor configured to process the instructions to:
encrypt or decrypt data stored in a database;
classify a selection condition included in a query to the database into a first selection condition that does not need encryption or decryption processing and a second selection condition that needs the encryption or decryption processing;
classify a table included in the query into a first table that refers to only the first selection condition and a second table;
generate a first query based on the first selection condition and the first table;
send the first query to a database server connected to the database to request a result from the database server, wherein the first query is sent to the database server without performing encryption or decryption processing on the first query;
generate a second query based on the second selection condition, the second table, and the result of the first query acquired from the database server;
process the second query using the encryption or decryption processing;
determine whether or not the first query should be executed by the database server in accordance with an increase or decrease of a data amount before and after processing when processing the first query by the database server; and when it is determined that the first query should not be executed by the database server, convert the first query into a third query and execute the third query.

2. The intermediate server according to claim 1, wherein, by classifying a plurality of first tables according to whether or not a column is referred to by the first selection condition, the at least one processor is configured to further divide the first query into a plurality of parts of the first query and send the plurality of parts obtained by dividing the first query to the database server to request a processing result with respect to each of the plurality of parts from the database server.

3. The intermediate server according to claim 1, wherein, when the data amount after execution is more increased than that before the execution when executing the first query by the database server, the at least one processor is configured to determine that the first query should not be executed by the database server.

4. The intermediate server according to claim 3, wherein the at least one processor is configured to:
separate the first query into a fourth query that is executed by acquiring first tables from the database server and a remaining fifth query to generate the third query consisting of the fourth query and the fifth query,
request the first tables from the database server to execute the fourth query, and
execute the fifth query.

5. A database query processing method executed by a computer, comprising:
classifying a selection condition included in a query to a database into a first selection condition that does not need encryption or decryption processing and a second selection condition that needs the encryption or decryption processing;
classifying a table included in the query into a first table that refers to only the first selection condition and a second table;
generating, by at least one hardware processor, a first query based on the first selection condition and the first table;
sending the first query to a database server connected to the database to request a result from the database server, wherein the first query is sent to the database server without performing encryption or decryption on the first query;
generating a second query based on the second selection condition, the second table, and the result of the first query acquired from the database server;
executing the second query using the encryption processing or the decryption processing;
determining whether or not the first query should be executed by the database server in accordance with an increase or decrease of a data amount before and after processing when processing the first query by the database server; and when it is determined that the first query should not be executed by the database server, converting the first query into a third query and executing the third query.

6. The database query processing method according to claim 5, wherein,
by classifying a plurality of first tables according to whether or not a column is referred to by the first selection condition, the first query is further divided into a plurality of parts of the first query,
the plurality of parts obtained by dividing the first query are sent to the database server, and
a processing result with respect to each of the plurality parts is acquired from the database server.

7. The database query processing method according to claim 5, wherein, when the data amount after execution is more increased than that before the execution when executing the first query by the database server, it is determined that the first query should not be executed by the database server.

8. The database query processing method according to claim 7, comprising:
when it is determined that the first query should not be executed by the database server, separating the first query into a fourth query that is executed by acquiring first tables from the database server and a remaining fifth query to generate the third query consisting of the fourth query and the fifth query;
acquiring the first tables from the database server to execute the fourth query, and
executing the fifth query.

9. A non-transitory computer readable medium that stores therein a program that, when executed, causes a computer to execute processing for:
classifying a selection condition included in a query to a database into a first selection condition that does not need encryption or decryption processing and a second selection condition that needs the encryption or decryption processing;
classifying a table included in the query into a first table that refers to only the first selection condition and a second table;
generating a first query based on the first selection condition and the first table;
sending the first query to a database server connected to the database to acquire a result from the database server, wherein the first query is sent to the database server without performing encryption or decryption on the first query;
generating a second query based on the second selection condition, the second table, and the result of the first query acquired from the database server;
executing the second query using the encryption processing or the decryption processing;
determining whether or not the first query should be executed by the database server in accordance with an increase or decrease of a data amount before and after processing when processing the first query by the database server; and when it is determined that the first query should not be executed by the database server, converting the first query into a third query and executing the third query.

10. The non-transitory computer readable medium according to claim 9, wherein,
by classifying a plurality of first tables according to whether or not a column is referred to by the first selection condition, the first query is further divided into a plurality of parts of the first query,
the plurality of parts obtained by dividing the first query are sent to the database server, and
a processing result with respect to each of the plurality of parts is acquired from the database server.

11. The non-transitory computer readable medium according to claim 9, wherein, when the data amount after execution is more increased than that before the execution when executing the first query by the database server, it is determined that the first query should not be executed by the database server.

12. The non-transitory computer-readable medium according to claim 11, which makes the computer execute:
when it is determined that the first query should not be executed by the database server, separating the first query into a fourth query that is executed by acquiring first tables from the database server and a remaining fifth query to generate the third query consisting of the fourth query and the fifth query;

acquiring the first tables from the database server to execute the fourth query, and executing the fifth query.

\* \* \* \* \*